United States Patent
Labrecque et al.

(10) Patent No.: US 11,895,553 B2
(45) Date of Patent: Feb. 6, 2024

(54) WEB APPLICATION WITH COMPONENTS IN DIFFERENT VIRTUAL ENVIRONMENTS

(71) Applicant: Red Hat, Inc., Raleigh, NC (US)

(72) Inventors: Daniel Arthur Labrecque, Hollis, NH (US); Dana Matthew Gutride, Pepperell, MA (US)

(73) Assignee: Red Hat, Inc., Raleigh, NC (US)

( * ) Notice: Subject to any disclaimer, the term of this patent is extended or adjusted under 35 U.S.C. 154(b) by 392 days.

(21) Appl. No.: 15/688,749

(22) Filed: Aug. 28, 2017

(65) Prior Publication Data
US 2019/0069124 A1 Feb. 28, 2019

(51) Int. Cl.
| | |
|---|---|
| *G06F 3/0481* | (2022.01) |
| *G06F 9/451* | (2018.01) |
| *G06F 16/955* | (2019.01) |
| *G06F 9/54* | (2006.01) |
| *G06F 9/455* | (2018.01) |

(Continued)

(52) U.S. Cl.
CPC ............ *H04W 4/02* (2013.01); *G06F 3/0481* (2013.01); *G06F 9/451* (2018.02); *G06F 9/541* (2013.01); *G06F 16/958* (2019.01); *G06F 16/9558* (2019.01); *G06F 9/45558* (2013.01)

(58) Field of Classification Search
CPC ........ G06F 9/451; G06F 3/048; G06F 3/0481; G06F 9/46; G06F 9/465; G06F 9/54; G06F 16/958; G06F 9/541; G06F 16/9558; G06F 9/45558; G06F 9/5005; G06F 9/5072; G06F 9/5077; H04L 67/02; H04L 67/10; H04L 67/01; H04W 4/02
See application file for complete search history.

(56) References Cited

U.S. PATENT DOCUMENTS

| | | |
|---|---|---|
| 7,770,121 B2 * | 8/2010 | Jain .................. G06F 9/451 717/109 |
| 8,813,065 B2 | 8/2014 | Zygmuntowicz et al. |

(Continued)

OTHER PUBLICATIONS

Marhee, Joseph D., "Running Multiple Web Applications on a Docker Host with Apache," Jun. 5, 2015, 9 pages. https://medium.com/@jmarhee/running-multiple-web-applications-on-a-docker-host-with-apache-85f673f02803.

(Continued)

*Primary Examiner* — Kieu D Vu
*Assistant Examiner* — Blaine T Basom
(74) *Attorney, Agent, or Firm* — Womble Bond Dickinson (US) LLP (57) ABSTRACT

A web application with multiple components located in different virtual environments. A method of the disclosure includes receiving a first request to access a first component of a web application from a client device, routing the client device to a first virtual environment where the first component of the web application is located based on the first request, wherein the first virtual environment uses a first runtime environment, receiving a second request to access a second component of the web application from the client device, and routing the client to a second virtual environment where the second component of the web application is located based on the second request, wherein the second virtual environment uses a second runtime environment and wherein the first runtime environment is different from the second runtime environment.

14 Claims, 8 Drawing Sheets

(51) Int. Cl.
  *H04W 4/02* (2018.01)
  *G06F 16/958* (2019.01)

(56) References Cited

U.S. PATENT DOCUMENTS

| | | | |
|---|---|---|---|
| 9,223,456 B2 | 12/2015 | Mokhtarzada et al. | |
| 9,912,517 B1* | 3/2018 | Ramalingam | G06F 9/5061 |
| 10,289,438 B2* | 5/2019 | Frye, Jr. | G06F 9/45558 |
| 10,673,952 B1* | 6/2020 | Cohen | H04L 67/16 |
| 2003/0167315 A1* | 9/2003 | Chowdhry | H04L 67/02 |
| | | | 709/218 |
| 2009/0089781 A1* | 4/2009 | Shingai | G06F 9/5088 |
| | | | 718/1 |
| 2010/0218124 A1* | 8/2010 | Aryanto | G06F 8/36 |
| | | | 715/762 |
| 2012/0136922 A1* | 5/2012 | Falkenberg | G06F 16/958 |
| | | | 709/203 |
| 2014/0229619 A1* | 8/2014 | Han | H04L 67/02 |
| | | | 709/225 |
| 2014/0282890 A1* | 9/2014 | Li | H04L 63/101 |
| | | | 726/4 |
| 2015/0067031 A1* | 3/2015 | Acharya | H04W 4/60 |
| | | | 709/203 |
| 2015/0142878 A1 | 5/2015 | Hebert et al. | |
| 2016/0154539 A1* | 6/2016 | Buddhiraja | G06F 9/45558 |
| | | | 715/738 |
| 2016/0371108 A1* | 12/2016 | Madtha | G06F 9/45558 |
| 2017/0052807 A1 | 2/2017 | Kristiansson et al. | |
| 2017/0213265 A1 | 7/2017 | Masherah et al. | |

OTHER PUBLICATIONS

Raboy, Nic, "Use NGINX as a Reverse Proxy to Your Containerized Docker Applications," Mar. 15, 2017, 6 pages. https://www.thepolyglotdeveloper.com/2017/03/nginx-reverse-proxy-containerized-docker-applications/.

"Using Containers to Build a Microservices Architecture," Jan. 20, 2015, 12 pages. https://medium.com/aws-activate-startup-blog/using-containers-to-build-a-microservices-architecture-6e1b8bacb7d1.

"Docwhat/Webtest-Docker," Aug. 2, 2017, 2 pages. https://github.com/docwhat/webtest-docker.

* cited by examiner

WEB APPLICATION WITH COMPONENTS IN DIFFERENT VIRTUAL ENVIRONMENTS

TECHNICAL FIELD

Aspects of the present disclosure relate to web applications, and more particularly, to web applications that include multiple components or portions.

BACKGROUND

Applications which are used by users for various purposes may be implemented using various paradigms. For example, an application may be installed and/or executed on a computing device (e.g., a tablet computer, a smartphone, a laptop computer, a desktop computer, etc.) of a user. A web application (also referred to herein as a web app) may be an application that uses a client-server model where the user interface of the application is presented by a web browser of a client device and where the actions, operations, functions, methods, calculations, etc., of the web application are generally performed by a server computing device. Examples of a web application may include, but are not limited to a messaging application, a video application, a social networking application, a video sharing application, a photo sharing application, a chat application, a content (e.g., video, music, etc.) delivery application, or any combination of such applications. A web application may be a computationally large or data-intensive application, such as a forecasting application, a modeling application, a data analysis application, etc. Web applications may also be referred to as Software as a Service (SaaS) applications.

The user interface of a web application may be presented to a user using a web page that is rendered by a web browser of a client device. A web page may include markup language such as hypertext markup language (HTML). The web page may also include various resources or objects, such as scripts, images, video, text, style sheets, etc. The web application may be divided into multiple components, which may be referred to as web application components or micro applications. Each web application component may perform different functions, operations, actions, processes, methods, etc., for the web application and/or may provide different services, functionalities, and/or resources for the web application. In some implementations of web applications, each web application component may be accessed by a web browser using a different uniform resource locator (URL). In other implementations of web applications, a single web page may be loaded by the web browser and the webpage may be dynamically updated as the user interacts with the web application (also referred to as single-page web application). Various programming languages and/or runtime environments may be used to implement the components of a web application. For example, the components of the web application may be implemented using JAVA, JavaScript, Perl, Python, etc.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a web application (also referred to herein as a web app) may be an application that uses a client-server model where the user interface of the application is presented by a web browser of a client device and where the actions, operations, functions, methods, calculations, etc., of the web application are generally performed by a server computing device. The web application may be divided into multiple components, which may be referred to as web application components or micro applications. Each web application component may perform different functions, operations, actions, processes, methods, etc., for a web application and/or may provide different services, functionalities, and/or resources for the web application.

A large web application (e.g., a web application with many different components which may be spread over many different server computing devices) may be developed, implemented, constructed, etc., by different teams/groups of developers (e.g., programmers). For example, a first component of the web application may be developed by a first team of developers in one country and a second component of the web application may be developed by a second team of developers in another country. Generally, the components of the web application need to use the same programming language and/or the same version of a programming language. Due to this constraint, a large amount of coordination is needed between the different teams of developers to allow the web application to function properly and to allow the different components of the web application to interact properly. In addition, the different teams of developers are generally forced to use the same programming language and often the same version of the programming language, even though different developers may prefer different programming languages. This may make it difficult to maintain and upgrade/scale the web application because new features may not be possible or may be difficult to implement using a chosen programming language.

The present disclosure addresses the above-noted and other deficiencies by allowing the components of the web application to operate within different virtual environments such as virtual machines and/or containers. Each component of the web application may be implemented using a different programming language/version of a programming language and may execute within a different runtime environment in a virtual environment. A proxy component may forward requests and data between the different virtual environments and a client device. The proxy component may also store state information in another virtual environment that allows the different components to communicate information/data with each other. This allows different developers to use their preferred programming language when developing components of the web application. This may also allow web applications to be developed more easily among larger teams of developers since each team of developers may develop their respective components without coordinating the programming language/version with the other teams. This also allows the web application to be updated/scaled up more easily since new components may be added more easily using a new virtual environment by updating the proxy component and/or state information so that the new components can communicate data with the previous components.

In addition, the graphical user interfaces (GUIs) presented by the different web application components may have a common visual styling (e.g., same fonts, menus, text, colors/color scheme, images, icons, etc.). This allows the users of the web application to have a seamless user experience such that the user is not aware that the different web application components are implemented/developed by different teams/developers and is not aware that the different web application components may use different programming languages or different versions of a programming language.

Figure 1:
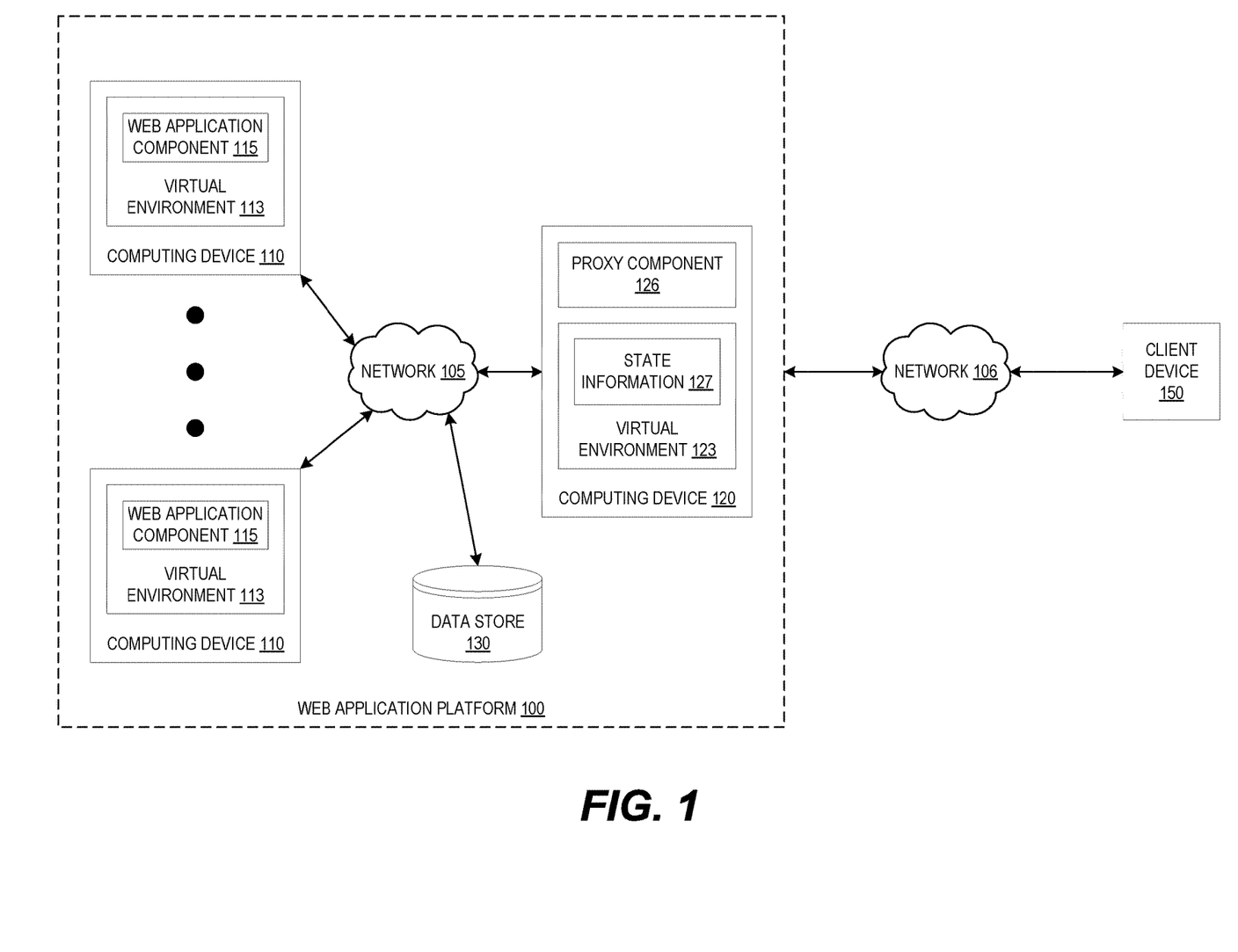
FIG. 1 is a block diagram that illustrates an example web application platform, in accordance with some embodiments of the present disclosure.

FIG. 1 is a block diagram that illustrates an example web application platform 100, in accordance with some embodiments of the present disclosure. As discussed above, a web application may be an application that uses a client-server model where the user interface of the application is presented by a web browser of a client device of a user and where actions, operations, functions, methods, calculations, etc., of the web application are generally performed by a server computing device. The web application may be divided into multiple web application components 115. Each web application component 115 may perform different functions, operations, actions, processes, methods, etc., for a web application and/or may provide different services, functionalities, and/or resources for the web application. For example, a first web application component 115 may allow users to view streaming videos (via the web application platform 100). The web application components 115 may present graphical user interfaces (GUIs) to users via a web browser of the client device 150. The web application platform 100 may host the web application. For example, different web application components 115 may be located on and/or may execute on different computing devices 110 of the web application platform 100, as discussed in more detail below.

As illustrated in FIG. 1, the web application platform 100 includes a plurality of computing devices 110, a computing device 120, a data store 130, and a network 104. The computing devices 110, the computing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 105 may carry communications (e.g., data, message, packets, frames, etc.) between computing devices 110, computing device 120, and the data store 130. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 110 and 120 may comprise any suitable type of computing device or machine that has a programmable processor including, for example, server computers, desktop computers, laptop computers, tablet computers, smartphones, set-top boxes, etc. In some examples, the computing devices 110 and 120 may comprise a single machine or may include multiple interconnected machines (e.g., multiple servers configured in a cluster). The computing devices 110 and 120 may be implemented by a common entity/organization or may be implemented by different entities/organizations. For example, a first computing device 110 may be operated by a first company/corporation and a second computing device 110 may be operated by a second company/corporation. Each computing device 110 and 120 may execute or include an operating system (OS), as discussed in more detail below. The OS of a computing device 110 may manage the execution of other components (e.g., software, applications, etc.) and/or may manage access to the hardware (e.g., processors, memory, storage devices etc.) of the computing device.

As illustrated in FIG. 1, each computing device 110 includes a virtual environment 113. In one embodiment, a virtual environment 113 may be a virtual machine (VM) that may execute on a hypervisor which executes on top of the OS for a computing device, as discussed in more detail below. The hypervisor may manage system sources (including access to hardware devices, such as processors, memories, storage devices), as discussed in more detail below. The hypervisor may also emulate the hardware (or other physical resources) which may be used by the VMs to execute software/applications, as discussed in more detail below. In another embodiment, a virtual environment 113 may be a container that may execute on a container engine which executes on top of the OS for a computing device, as discussed in more detail below. The container engine may allow different containers to share the OS of a computing device (e.g., the OS kernel, binaries, libraries, etc.), as discussed in more detail below. The container engine may also perform other functions, as discussed in more detail below.

Also as illustrated in FIG. 1, each virtual environment 113 includes a web application component 115. For example, web application component 115 may execute in a VM or a container. Although one web application component 115 is illustrated in a respective virtual environment 113, a virtual environment 113 may include multiple web application components 115 in other embodiments. In addition, the web application platform 100 may use the same type or different types of virtual environments 113. For example, each virtual environment 113 may be a VM. In another example, each virtual environment 113 may be a container. In a further example, some of the virtual environments 113 may be VMs and other virtual environments 113 may be containers.

Each virtual environment 113 may include a runtime environment (not illustrated in the figures). A runtime environment may refer to a configuration of hardware and/or software that supports the execution of different types of applications which may be written in different programming languages. Different runtime environments may allow/use different programming languages and/or different versions of programming languages.

The computing device 120 includes a proxy component 126 and a virtual environment 123 (e.g., a virtual machine, a container, etc.). The proxy component 126 may receive requests to access, use, and/or communicate with different components of the web application hosted by the web application platform, from the client device 150 (via network 106). For example, a user of the client device may access an account management portion/component of the web application using a web browser. In another example, a user of the client device 150 may access a contact portion/component of the web application (e.g., a "Contact Us" portion/component that allows the user to send a message/email) using a web browser. The proxy component 126 may determine which computing device 110 has the web application component 115 requested by the user. For example, the proxy component 126 may determine which computing device 110 is executing the requested web application component 115 within their respective virtual environment 113. The proxy component 126 may route the client device 150 to the computing device 110 and/or virtual environment 113 where the requested web application component 115 is located.

The proxy component 126 may route different requests from the client device 150 to different computing devices 110 and/or different virtual environments 113. For example, the proxy component 126 may receive a first request (to access a first component of the web application, such as the management portion/component) and may route the client device to a first virtual environment 113 (e.g., a first VM, a first container, etc.). The proxy component 126 may receive a second request (to access a second component of the web application, such as Contact Us portion/component) and may route the client device to a second virtual environment 113 (e.g., a second VM, a second container, etc.).

As discussed above, each virtual environment 113 includes a runtime environment. The runtime environments for the virtual environments 113 may be different. In one embodiment, a first runtime environment may use a different programing language than a second runtime environment. For example, a first runtime environment may use JavaScript and a second runtime environment may use Python. In another embodiment, a first runtime environment may use a different version of a programming language than a second runtime environment. For example, a first runtime environment may use JavaScript version 5.1 and a second runtime environment may use JavaScript version 6. In a further embodiment, a first runtime environment may use different libraries and/or different version of libraries than a second runtime environment. For example, a first runtime environment may use AngularJS (e.g., a JavaScript based library) and a second runtime environment may use React (a different JavaScript based library). In another example, a first runtime environment may use AngularJS version 1.5 and a second runtime environment may use AngularJS version 4.

As discussed above, the web application components 115 may present/provide graphical user interfaces (GUIs) to the client device 150 via a web browser (of the client device 150). Although the application components 115 may have different runtime environments (e.g., may use different programming languages, different libraries, different versions of libraries/programming languages, etc.), the web application components 115 may provide GUIs that have a common visual styling. For example, web application components 115 may present GUIs that use the same types of menus (e.g., drop down menus, a list box, etc.), the same items/options within menus, the same fonts, the same colors or color schemes, the same layout of user interface elements/widgets (e.g., radio buttons, text boxes, check boxes), the same images, videos, animations, icons, text, etc. Various libraries may be used to allow the web application components 115 to present GUIs that have a common visual styling. For example, the PatternFly library may be used to allow the web application components 115 to present GUIs that have common visual styling.

In one embodiment, the proxy component 126 may store information that is used across the different application components 115 in the state information 127. For example, the same top level menu may be presented by each web application component 115. The items/text in the menu may be common across all of the different web application components 115. The state information 127 may store data indicating the items/text that should be in the top level menu. In another example, the state information 127 may include login credentials/tokens for a user. For example, the state information 127 may store the user's username and password once the user has logged into the web application.

In another embodiment, the state information 127 may allow different web application components 115 to communicate with each other. For example, a first web application component 115 may need certain data (e.g., an account balance) to perform an action, operation, function, etc., requested by the user (e.g., to purchase a product). The data may be generated by a second web application component 115 (e.g., an account management component). The proxy component 126 (and/or the second web application component 115) may store the data (used to perform the request action, operation, function, etc.) in the state information 127 so that the first web application component 115 may use the data. For example, a user may update an account setting (or perform some other operation/action) using a second web application component 115. The account setting (or other operation/action) may be used by a first web application component 115 and/or may affect the operation of the first web application component 115.

In a further embodiment, the proxy component 126 may update the state information 127 based on one or more interactions between the client device 150 and a web application component 115. For example, a user may interact with a first web application component 115 that allows the user to purchase a product. The proxy component 126 (and/or the first web application component 115) may update state information 127 to decrease/debit the user's account balance by the purchase price of the product. The proxy component 126 may provide the updated state information 127 (with the new account balance) to a second web application component 115 that allows a user to view the transactions on the account, when the user interacts with the second web application component 115.

As illustrated in FIG. 1, the state information 127 may be located in a virtual environment 123. For example, the state information 127 may be stored in a container or a VM. Although the proxy component 126 is illustrated as being separate from the virtual environment 123, the proxy component may also be located within the virtual environment 123 in other embodiments.

As discussed above, by allowing the components of the web application to operate within different virtual environments, each component of the web application may be implemented using a different programming language/version of a programming language and may execute within a different runtime environment in a virtual environment. This allows different developers to use their preferred programming language when developing components of the web application and may also allow web applications to be developed more easily among larger teams of developers (since each team of developers may develop their respective components without coordinating the programming language/version with the other teams). This further allows the web application to be updated/scaled up more easily since new components may be added more easily. In addition, the common visual styling (e.g., same fonts, menus, text, colors/color scheme, images, icons, etc.) of the GUIs allows the users of the web application to have a seamless user experience regardless of who developed the different web application components 115 and what programming languages/versions are used by the different web application components 115.

Figure 2A:
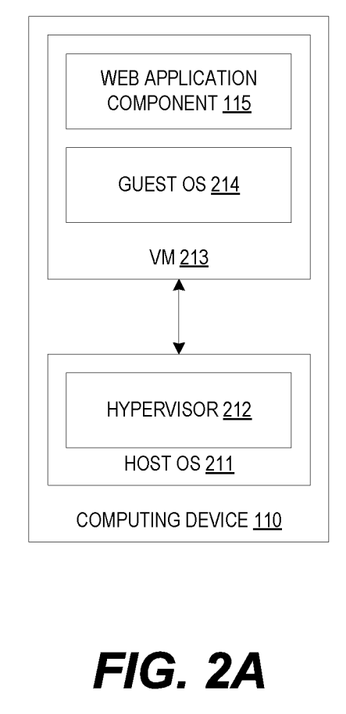
FIG. 2A is a block diagram that illustrates an example virtual environment executing within a computing device, in accordance with some embodiments of the present disclosure.

FIG. 2A is a block diagram that illustrates an example virtual environment executing within a computing device, in accordance with some embodiments of the present disclosure. The computing device 110 may include hardware (e.g., processing devices, memory, storage devices, other devices, etc.) and a host OS 211. As discussed above, one type of a virtual environment may be a VM 213 executing on a computing device 110. In one embodiment, the VM 213 may be a software implementation of a machine (e.g., a software implementation of a computing device) that includes its own operating system (referred to as guest OS 214) and executes application programs, applications, software. VM 213 may be, for example, a hardware emulation, a full virtualization, a para-virtualization, and an operating system-level virtualization VM.

Computing device 110 may include a hypervisor 212, which may also be known as a virtual machine monitor (VMM). In the example shown, hypervisor 212 may be a component of a host operating system 211. In another example, hypervisor 212 may run on top of a host operating system 211, or may run directly on host hardware without the use of a host operating system 211. Hypervisor 212 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 212, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. Hypervisor 212 may present other software (i.e., "guest" software) the abstraction of one or more virtual machines (VMs) that provide the same or different abstractions to various guest software (e.g., guest operating system, guest applications).

VM 213 may execute guest software that uses an underlying emulation of the physical resources (e.g., virtual processors and guest memory). As illustrated in FIG. 2A, VM 213 may execute a web application component (e.g., a component/part of a larger web application) within a runtime environment (not shown in the figures). The web application component 115 may be accessed and/or used by a user via a web browser of a client device. Access requests and/or data may be routed between the web application component 115 and the client device via a proxy agent, as discussed above. The web application component 115 may have a runtime environment that is different than the runtime environments of other web application components (e.g., web application component 115 illustrated in FIG. 2B). For example, the web application component 115 may be implemented using AngularJS and may execute within a runtime environment that uses AngularJS. A second web application component 115 (e.g., web application component 115 illustrate in FIG. 2B) may be implemented using React and may execute within a different runtime environment that uses React. As discussed above, although the web application component 115 may use a different runtime environment when compared to other web application components, the web application components 115 may present a GUI that has a visual styling that is common to the GUIs presented by the other web application components.

Figure 2B:
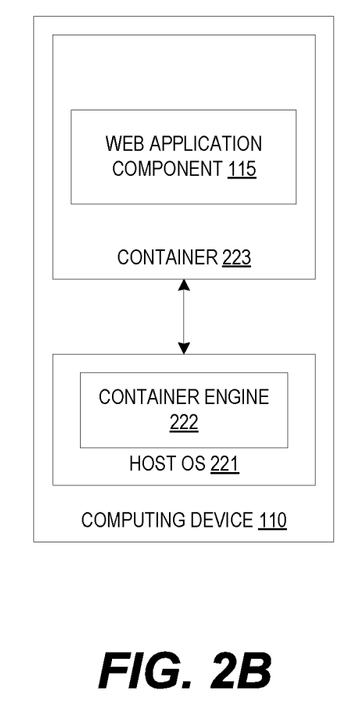
FIG. 2B is a block diagram that illustrates an example virtual environment executing within a computing device, in accordance with some embodiments of the present disclosure.

FIG. 2B is a block diagram that illustrates an example virtual environment executing within a computing device, in accordance with some embodiments of the present disclosure. The computing device 110 may include hardware (e.g., processing devices, memory, storage devices, other devices, etc.) and a host OS 221. As discussed above, one type of a virtual environment may be a container 223 executing on a computing device 110. In one embodiment, the container 223 may be an isolated set of resources allocated to executing an application, software, and/or process independent from other applications, software, and/or processes. The host OS 221 may use namespaces to isolate the resources of the containers from each other. In another embodiment, the container 223 may be a virtualized object similar to virtual machines. However, container 223 may not implement separate guest OS (like VM 213 illustrated in FIG. 2A). The container 223 may share the kernel, libraries, and binaries of the host OS 221 with other containers that are executing on the computing device 110. Although FIG. 2B illustrates one container 223, the computing device 110 may include multiple containers in other embodiments. Each container may have one or more respective, filesystems, memories, devices, network ports, etc., for accessing the physical resources of the computing device 110.

In one embodiment, the container engine 222 may allow different containers to share the host OS 221 (e.g., the OS kernel, binaries, libraries, etc.) of the computing device 110. For example, the container engine 222 may multiplex the binaries and/or libraries of the host OS 221 between multiple containers. The container engine 222 may also facilitate interactions between the container and the resources of the computing device 110. For example, the container engine 222 may manage requests from container 223 to access a memory (e.g., a RAM) of the computing device 110. In another example, the container engine 222 may manage requests from the container 223 to access certain libraries/binaries of the host OS 223. In other embodiments, the container engine 222 may also be used to create, remove, and manage containers. In one embodiment, the container engine 222 may be a component of a host operating system 221. In another embodiment, container engine 222 may run on top of a host operating system 221, or may run directly on host hardware without the use of a host operating system 221.

As illustrated in FIG. 2B, web application component 115 (e.g., a component/part of a larger web application) may execute within the container 223. For example, the web application component 115 may execute within a runtime environment (not shown in the figures) of the container 223. The web application component 115 may be accessed and/or used by a user via a web browser of a client device. Access requests and/or data may be routed between the web application component 115 and the client device via a proxy agent, as discussed above. The web application component 115 may have a runtime environment that is different than the runtime environments of other web application components (e.g., web application component 115 illustrated in FIG. 1A). For example, the web application component 115 may be implemented using React and may execute within a runtime environment that uses React. A second web application component 115 (e.g., web application component 115 illustrate in FIG. 2A) may be implemented using AngularJS and may execute within a different runtime environment that uses AngularJS. As discussed above, although the web application component 115 may use a different runtime environment when compared to other web application components, the web application components 115 may present a GUI that has a visual styling that is common to the GUIs presented by the other web application components.

Figure 3A:
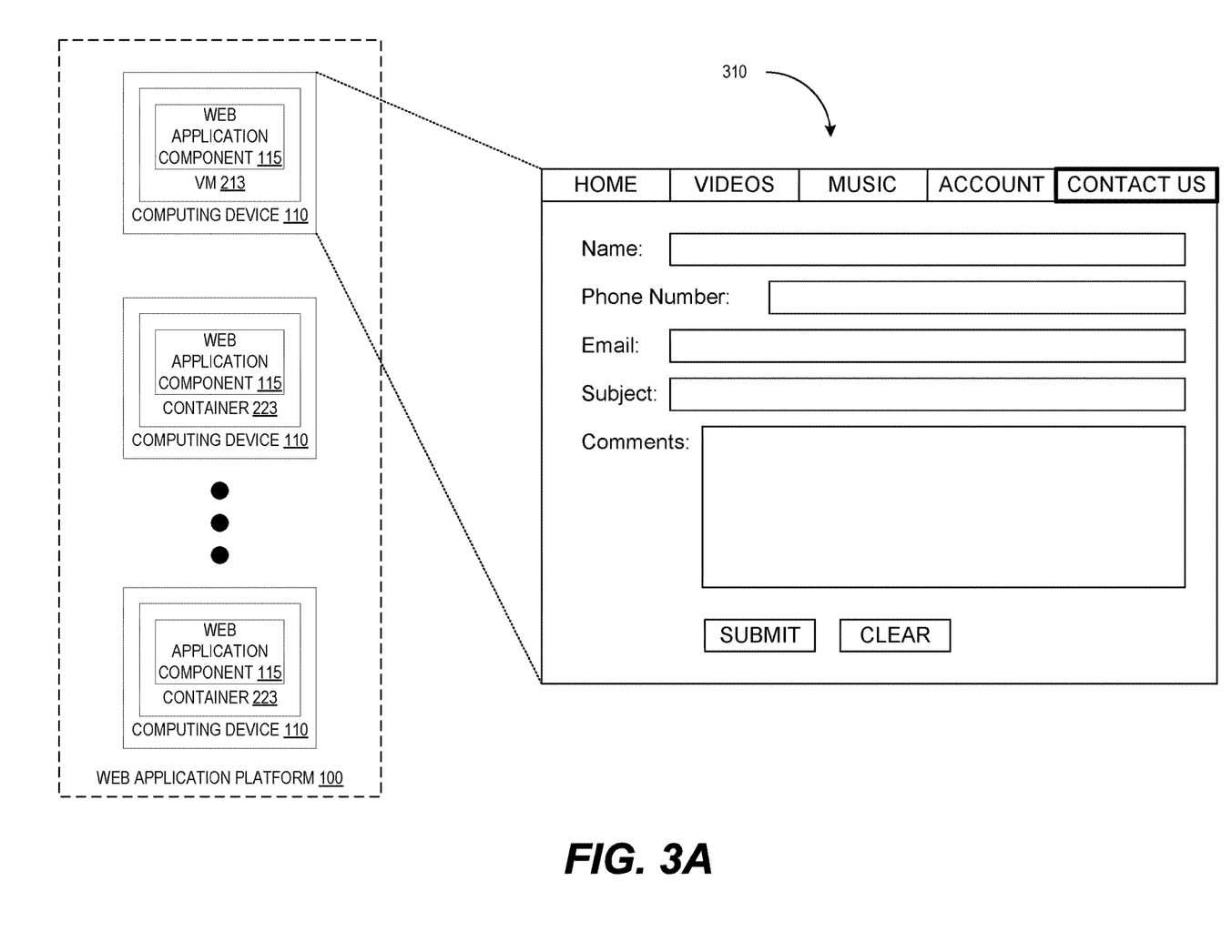
FIG. 3A is a diagram that illustrates an example graphical user interface which may be presented/provided by a web application component, in accordance with some embodiments of the present disclosure.

FIG. 3A is a diagram that illustrates an example graphical user interface 310 which may be presented/provided by a web application component, in accordance with some embodiments of the present disclosure. As discussed above, a user may access a web application (provided by web application platform 100) using a browser on a client device. The web application may be divided into multiple web application components and the web application components may be located within virtual environments such as VMs 213 and/or containers 223. The VMs 213 and/or containers 223 may be located on (e.g., may execute on) different computing devices 110, as discussed above and as illustrated in FIG. 3A.

As illustrated in FIG. 3A, the top most web application component 115 may execute within VM 213. The VM 213 may use a first runtime environment that may be different from the runtime environments of the other VMs 213 and the other containers 223 (on the other computing devices 110) of the web application platform 100. For example, the top most VM 213 may use Angular version 1.5 and the top most container 223 may use React. The top most web application component 115 may present the GUI 310 to a user via a web browser of the user's client device. The GUI 310 may present a visual styling that is common throughout the different GUIs presented by the other VMs 213 and the other containers 223 (e.g., similar or same color, color scheme, text, fonts, images, menus, user interface elements/widgets, etc.). For example, the GUI 310 may include the same top menu (with the options "HOME," "VIDEOS," "MUSIC," "ACCOUNT," and "CONTACT US,") as the GUI 320 (illustrated in FIG. 3B). The items in the menu (which may be common across GUI 310 and GUI 320) may be stored in state information (e.g., state information 127 illustrated in FIG. 1), as discussed above.

Figure 3B:
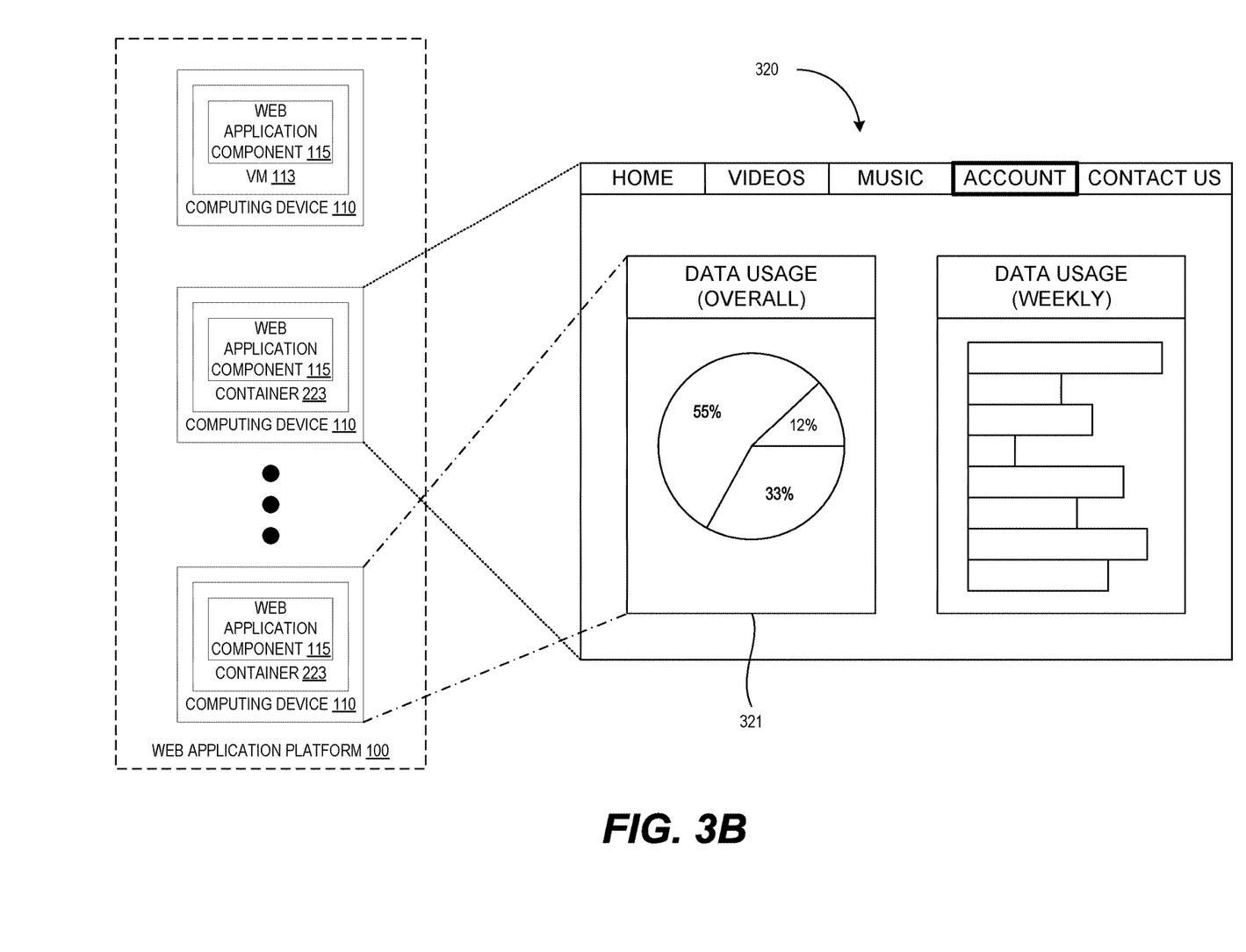
FIG. 3B is a diagram that illustrates an example graphical user interface which may be presented/provided by a web application component, in accordance with some embodiments of the present disclosure.

FIG. 3B is a diagram that illustrates an example graphical user interface which may be presented/provided by a web application component, in accordance with some embodiments of the present disclosure. As discussed above, a user may access a web application (provided by web application platform 100) using a browser on a client device. The web application may be divided into multiple web application components and the web application components may be located within virtual environments such as VMs 213 and/or containers 223. The VMs 213 and/or containers 223 may be located on (e.g., may execute on) different computing devices 110, as discussed above and as illustrated in FIG. 3B.

As illustrated in FIG. 3B, the second top most web application component 115 may execute within the top most container 223. The top most container 223 may use a first runtime environment that may be different from the runtime environments of the other VMs 213 and the other containers 223 (on the other computing devices 110) of the web application platform 100. For example, the top most container 223 may use React and the top most VM 213 may use Angular version 1.5. The second top most web application component 115 may present the GUI 320 to a user via a web browser of the user's client device. The GUI 320 may present a visual styling that is common throughout the different GUIs presented by the other VMs 213 and the other containers 223 (e.g., similar or same color, color scheme, text, fonts, images, menus, user interface elements/widgets, etc.). For example, the GUI 320 may include the same top menu (with the options "HOME," "VIDEOS," "MUSIC," "ACCOUNT," and "CONTACT US,") as the GUI 310 (illustrated in FIG. 3A). The items in the menu (which may be common across GUI 310 and GUI 320) may be stored in state information (e.g., state information 127 illustrated in FIG. 1), as discussed above.

The GUI 320 also includes a user interface element 321 (e.g., a user interface widget) that allows a user to view their overall data usage. The user interface element 321 may be presented by the bottom most web application component 115 (which is located in the bottom most container 115). For example, the user interface element 321 may be presented within an iframe of the web page where the GUI 320 is presented. In another embodiment, the user interface element 321 may be presented by the second top most web application component 115 (instead of the bottom most web application component 115). A proxy component and/or the bottom most web application component 115 may update state information (e.g., state information 127) with data indicating the overall data use of the user. The proxy component and/or the second top most web application component 115 may access the state information to display the proper values (of the overall data usage) in the user interface element 321.

Figure 4:
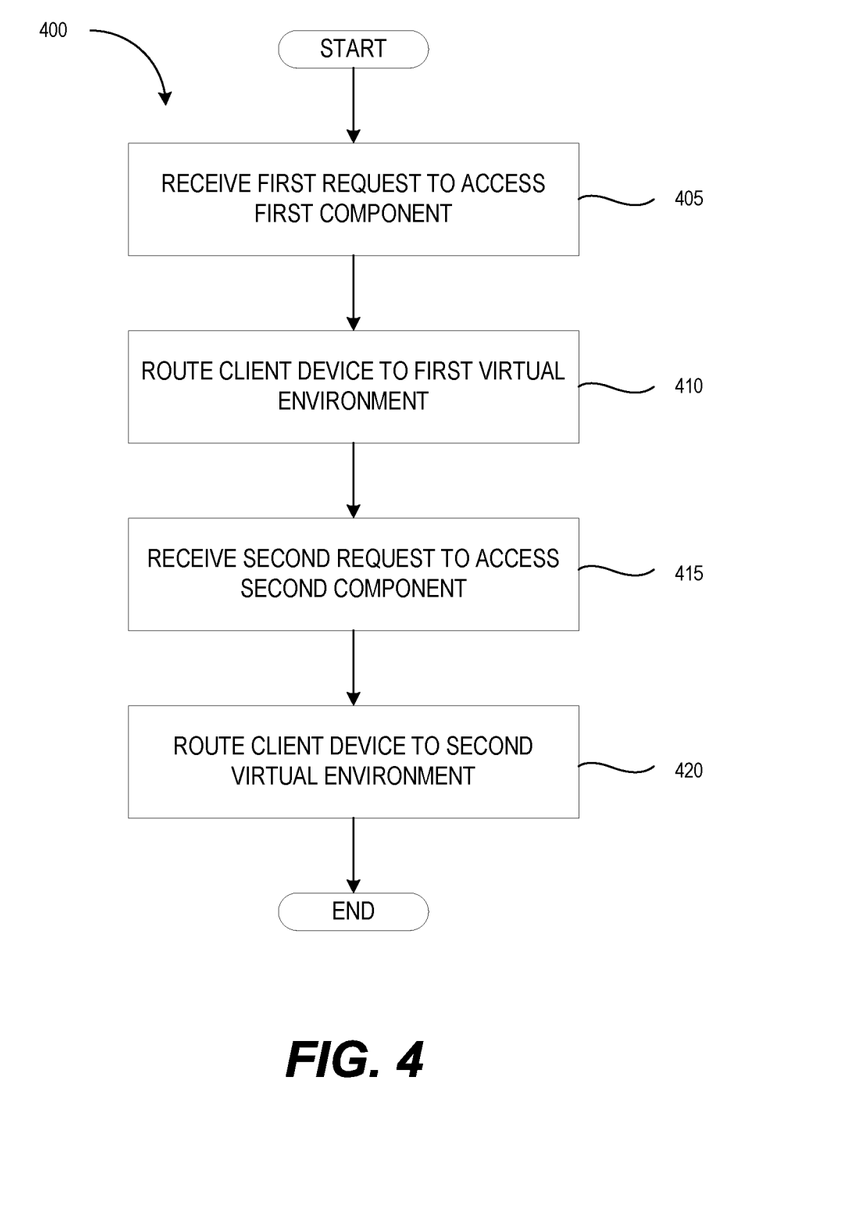
FIG. 4 is a flow diagram of a method of operating a web application, in accordance with some embodiments of the present disclosure.

FIG. 4 is a flow diagram of a method 400 of operating a web application in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a proxy component (e.g., proxy component 126 illustrated in FIG. 1) and/or a computing device (e.g., computing device 120 illustrated in FIG. 1).

The method 400 begins at block 405, where a first request to access a first component of a web application (e.g., a first web application component) is received from a client device. For example, referring to FIG. 3A, a user may click on the "CONTACT US" menu item of a GUI to access the first component using a web browser of the client device. The method 400 may route the client device to a first virtual environment where the first component is located at block 410. For example, referring to FIG. 3A, the client device and/or the first request may be routed to top most web application component 115 in the top most VM 213 and the top most web application component 115 may present the GUI 310 which includes the text fields illustrated in FIG. 3A (e.g., the Name, Phone Number, Email, Subject, and Comments text fields), the Submit button, and the Clear button.

At block 415, a second request to access a second component of a web application (e.g., a second web application component) is received from the client device. For example, referring to FIG. 3B, a user may click on the "ACCOUNT" menu item of a GUI to access the second component using the web browser of the client device. The method 400 may route the client device to a second virtual environment where the second component is located. For example, referring to FIG. 3B, the client device and/or the first request may be routed to the second top most web application component 115 in the top most container 223 and the second top most web application component 115 may present the GUI 320.

Figure 5:
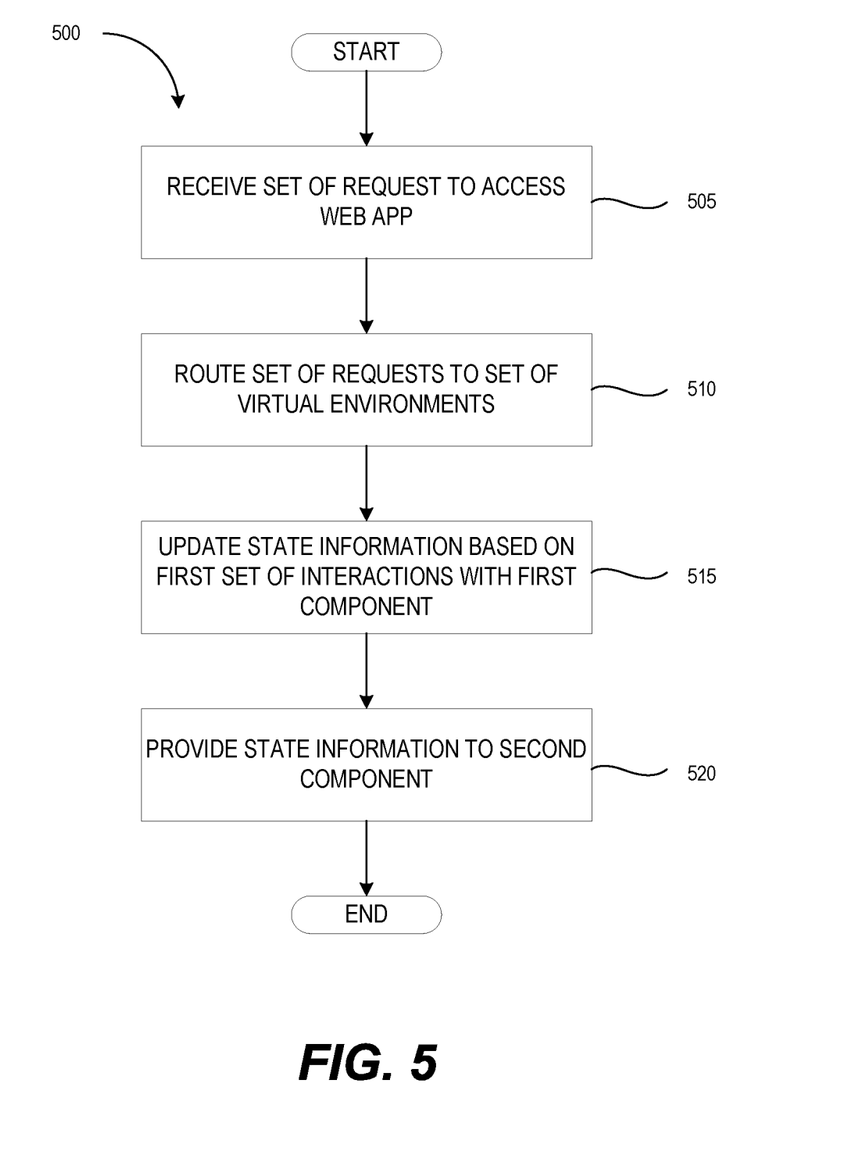
FIG. 5 is a flow diagram of a method of updating state information, in accordance with some embodiments of the present disclosure.

FIG. 5 is a flow diagram of a method 500 of updating state information in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a proxy component (e.g., proxy component 126 illustrated in FIG. 1) and/or a computing device (e.g., computing device 120 illustrated in FIG. 1).

The method 500 begins at block 505 where one or more requests (e.g., a set of requests) to access a web application are received. For example multiple requests to access multiple components of the web application may be received from a client device via a web browser, as discussed above. A block 510, the one or more requests may be routed one or more virtual environments (e.g., a set of virtual environments). For example, a first request to access a first component (e.g., a first web application component) may be routed to a VM and a second request to access a second component (e.g., a second web application component) may be routed to another VM. In another example, a first request to access the first component may be routed to a VM and a second request to access the second component may be routed to a container. In a further example, a first request to access the first component may be routed to a container and a second request to access the second component may be routed to another container.

At block 515, the method 500 may update state information based on a first set of interactions between a client device and the first component. For example, a user may perform one or more actions via a GUI present by the first component (e.g., the user may update a notification preference from phone calls to email, etc.). The updated state information may be provided to the second component. For example, updated notification preference (changing the method of contacting the user from phone calls to email) may be provided to the second component when the client device interacts with the second component to cause the second component to send a confirmation code to the user. The second component may determine that the notification preference has been changed and may email the confirmation code to the user's email rather than calling the user.

Figure 6:
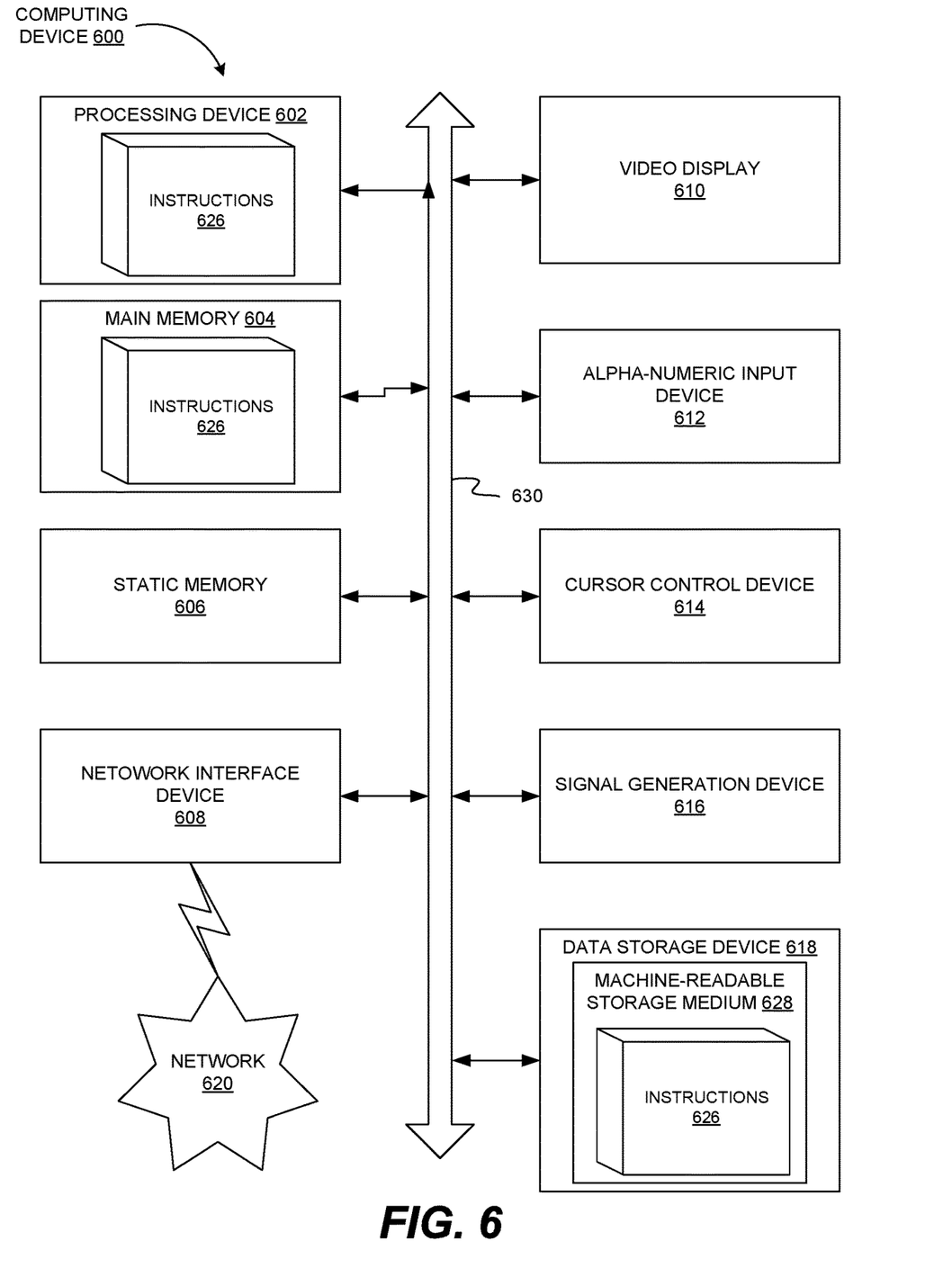
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Instructions implementing module 626 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 7:
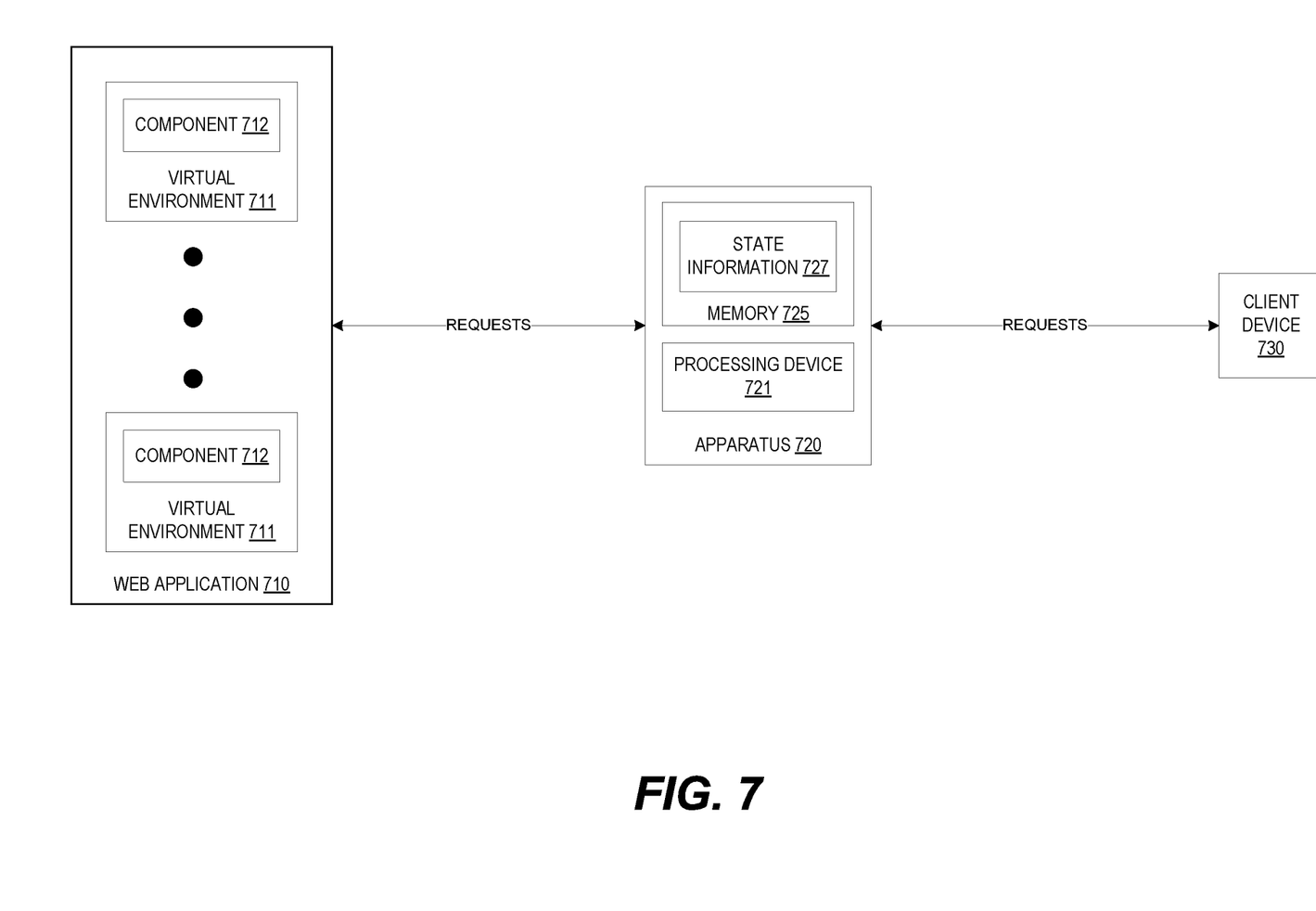
FIG. 7 is a block diagram of an example apparatus that may perform one or more of the operations described herein, in accordance with some embodiments

FIG. 7 is a block diagram of an example apparatus 700 that may perform one or more of the operations described herein, in accordance with some embodiments. The apparatus 700 includes a memory 725 to store state information 727. The apparatus 700 also includes a processing device 721 operatively coupled to the memory. The processing device 721 may receive, from a client device 730, a set of requests to access a web application 710. The web application 710 includes a plurality of components 712. The processing device 721 may route the set of requests to a set of virtual environments 711. Each component 712 of the web application 710 is located in a respective virtual environment 711. The processing device 721 may also update the state information based on a first set of interactions between the client device and a first component 712 of the web application. The processing devices 721 may also provide the state information 727 to a second component 712 of the web application 710. The state information may include first data that is used by the second component 712 for a second set of interactions between the client device 730 and the second component 712 of the web application 710.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving, by a computing device, a first request to access a first component of a web application from a client device, wherein the computing device is different than the client device;
   routing the client device to a first virtual environment where the first component of the web application is located in view of the first request, wherein the first virtual environment uses a first runtime environment, and wherein the first component comprises a first set of graphical features from a library comprising a plurality of graphical features having a visual appearance of the web application;
   providing, to the client device, a first graphical user interface (GUI) for the first component having the visual appearance of the web application using the first set of graphical features from the library;
   receiving, by the computing device, a second request to access a second component of the web application from the client device;
   routing the client to a second virtual environment where the second component of the web application is located in view of the second request, wherein the second virtual environment uses a second runtime environment and wherein the first runtime environment is different from the second runtime environment, and wherein the second component comprises a second set of graphical features from the library;
   providing, to the client device, a second GUI for the second component having the visual appearance of the web application using the second set of graphical features from the library, wherein the first set of graphical features and the second set of graphical features of the library provide a common visual styling for the first component and the second component, the common visual styling comprising one or more of the same fonts, menus, text, color scheme, images, and icons;
   receiving a third request to add a third component to the web application;
   generating, by a processing device of the computing device, a third virtual environment that uses a third runtime environment to execute the third component, wherein the first and second virtual environments each comprise a virtual machine and the third virtual environment comprises a container, and wherein the container of the third virtual environment is a proxy component to direct the first request and second request to the corresponding first component and second component, and wherein the first component comprises a first programming language and the second component comprises a second programming language different from the first programming language, wherein the first runtime environment supports the first programming language and the second runtime environment support the second programming language and the first GUI and the second GUI present a common visual appearance for the first component in the first programming language and the second component in the second programming language via the common visual styling of the plurality of graphical features of the library;
   storing, in the container of the third virtual environment, state information associated with the first and second components of the web application, wherein the state information comprises information of the web application that is consistent across the first and second components of the web application and wherein the state information is accessible by the first and second components;
   adding a fourth component to the web application within a fourth virtual environment, wherein the fourth virtual environment comprises a third programming language different from the first programming language and the second programming language; and
   updating the state information stored at the container of the third virtual environment to allow the fourth component to communicate with the first and second components, wherein the updated state information comprises information of the web application that is consistent across the first, second, and fourth components of the web application.

2. The method of claim 1, wherein the fourth virtual environment comprises a virtual machine.

3. The method of claim 1, wherein the fourth virtual environment comprises a container.

4. The method of claim 1, wherein the first runtime environment uses a different version of a programming language than the second runtime environment.

5. The method of claim 1, further comprising:
   updating the state information in view of a first set of interactions between the client device and the first component of the web application; and
   providing the state information to the second component of the web application, wherein the state information comprises first data that is used by the second component of the web application for a second set of interactions between the client device and the second component of the web application.

6. The method of claim 1, wherein a third graphical user interface (GUI) presents the fourth component via the common visual appearance presented by the first graphical user interface and the second graphical interface.

7. An apparatus, comprising:
   a memory to store state information;
   a processing device of a computing device operatively coupled to the memory, the processing device to:
   receive, by the computing device from a client device, a set of requests to access a web application comprising a plurality of components, wherein the computing device is different than the client device;
   route the set of requests to a set of virtual environments, wherein each component of the web application is located in a respective virtual environment, and wherein each component comprises corresponding sets of graphical features from a library comprising a plurality of graphical features having a visual appearance of the web application, and wherein a first component of the web application comprises a first programming language and a second component of the web application comprises a second programming language that is different from the first programming language;

provide, to the client device, a graphical user interface (GUI) for each component of the web application, the GUI for each component of the web application having a visual appearance of the web application using the corresponding sets of graphical features from the library, wherein the sets of graphical features of the library corresponding to the components of the web application provide a common visual styling for the corresponding components of the web application, the common visual styling comprising one or more of the same fonts, menus, text, color scheme, images, and icons;

receive a request to add a new component to the web application;

generate a new virtual environment that uses a new runtime environment to execute the new component, wherein each virtual environment of the set of virtual environments comprises a virtual machine and the new virtual environment comprises a container, and wherein the container is a proxy component to direct the set of requests to the corresponding components of the web application, and wherein a first virtual environment executing the first component of the web application supports the first programming language and a second virtual environment executing the second component of the web application supports the second programming language and the GUI for the first component and the second component present a common visual appearance for the first component in the first programming language and the second component in the second programming language via the common visual styling of the plurality of graphical features of the library;

store, in the container of the new virtual environment, state information associated with the plurality of components of the web application, wherein the state information comprises information of the web application that is consistent across the plurality of components of the web application and wherein the state information is accessible by each of the plurality of components;

update the state information in view of a first set of interactions between the client device and the first component of the web application and the new virtual environment;

provide the state information to the second component of the web application, wherein the state information comprises first data that is used by the second component for a second set of interactions between the client device and the second component of the web application;

add an additional component to the web application within an additional virtual environment, wherein the additional virtual environment comprises a third programming language different from the first programming language and the second programming language; and update the container comprising the proxy component to allow the additional component to communicate with each of the other components of the web application, wherein the state information comprises information of the web application that is consistent across the first, second, and additional components of the web application.

8. The apparatus of claim 7, wherein the first virtual environment of the set of virtual environments uses a first runtime environment, wherein the second virtual environment of the set of virtual environments uses a second runtime environment, and wherein the first runtime environment is different from the second runtime environment.

9. The apparatus of claim 8, wherein the first runtime environment uses a different version of a programming language than the second runtime environment.

10. The apparatus of claim 7, wherein the additional virtual environment comprises a container.

11. The apparatus of claim 7, wherein the additional virtual environment comprises a virtual machine.

12. A non-transitory computer-readable storage medium including instructions that, when executed by a processing device of a computing device, cause the processing device to:

receive, by the computing device, a first request to access a first component of a web application from a client device, wherein the computing device is different than the client device;

route the client device to a first virtual environment where the first component of the web application is located in view of the first request, wherein the first virtual environment uses a first runtime environment, and wherein the first component comprises a first set of graphical features from a library comprising a plurality of graphical features having a visual appearance of the web application;

provide, to the client device, a first graphical user interface (GUI) for the first component having a visual appearance of the web application using the first set of graphical features from the library;

receive a second request to add a second component to the web application; and generate, by the processing device, a second virtual environment that uses a second runtime environment to execute the second component;

update state information in view of a first set of interactions between the client device and the first component of the web application and the generated second virtual environment;

receive a third request to access a third component of the web application from the client device;

route the client to a third virtual environment where the third component of the web application is located based on the third request, wherein the third virtual environment uses a third runtime environment and wherein the first runtime environment and the second runtime environment are different from the third runtime environment, and wherein the third component comprises a second set of graphical features from the library;

provide, to the client device, a second GUI for the third component having the visual appearance of the web application using the second set of graphical features from the library, wherein the first set of graphical features and the second set of graphical features of the library provide a common visual styling for the first component and the third component, the common visual styling comprising one or more of the same fonts, menus, text, color scheme, images, and icons;

provide the state information to the third component of the web application, wherein the state information comprises first data that is used by the third component of the web application for a second set of interactions between the client device and the third component of the web application, wherein the first and third virtual environments each comprise a virtual machine and the second virtual environment comprises a container, and wherein the state information is stored at the container of the second virtual environment, and wherein the container is a proxy component to direct the first request and the third request to the corresponding first component and the third component of the web application, and wherein the first component comprises a first programming language and the third component comprises a second programming language different from the first programming language, wherein the first runtime environment supports the first programming language and the third runtime environment support the second programming language and the first GUI and the second GUI present a common visual appearance for the first component in the first programming language and the third component in the second programming language via the common visual styling of the plurality of graphical features of the library;

add a fourth component to the web application within a fourth virtual environment, wherein the fourth virtual environment comprises a third programming language different from the first programming language and the second programming language; and update the container of the second virtual environment to allow the fourth component to communicate with the first and third components, wherein the state information comprises information of the web application that is consistent across the first, second, and third components of the web application.

13. The non-transitory computer-readable storage medium of claim 12, wherein the first runtime environment uses a different version of a programming language than the second runtime environment and the third runtime environment.

14. The non-transitory computer-readable storage medium of claim 12, wherein a third GUI presents the fourth component via the common visual appearance as presented by the first GUI and the second GUI.

* * * * *